US009396749B2

(12) United States Patent
Asselin et al.

(10) Patent No.: US 9,396,749 B2
(45) Date of Patent: Jul. 19, 2016

(54) WAVEGUIDE CORE LAYER WITH REDUCED DOWNTRACK THICKNESS PROXIMATE A NEAR-FIELD TRANSDUCER

(71) Applicant: Seagate Technology LLC, Cupertino, CA (US)

(72) Inventors: Pierre Asselin, Richfield, MN (US); Ruoxi Yang, St. Louis Park, MN (US); James Gary Wessel, Savage, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 14/691,204

(22) Filed: Apr. 20, 2015

(65) Prior Publication Data

US 2015/0302874 A1 Oct. 22, 2015

Related U.S. Application Data

(60) Provisional application No. 61/981,955, filed on Apr. 21, 2014.

(51) Int. Cl.
*G11B 11/00* (2006.01)
*G11B 5/60* (2006.01)
*G11B 5/31* (2006.01)
*G11B 5/00* (2006.01)
*G11B 11/105* (2006.01)

(52) U.S. Cl.
CPC ............. *G11B 5/6088* (2013.01); *G11B 5/314* (2013.01); *G11B 11/10532* (2013.01); *G11B 11/10543* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,264,919 B2 | 9/2012 | Komura et al. | |
| 8,509,038 B1 | 8/2013 | Sasaki et al. | |
| 8,619,517 B1 | 12/2013 | Sasaki et al. | |
| 2007/0230288 A1* | 10/2007 | Nishida ................ | B82Y 10/00 369/13.13 |
| 2007/0242921 A1* | 10/2007 | Matsumoto ............ | B82Y 20/00 385/33 |
| 2011/0019510 A1* | 1/2011 | Nishida ................ | B82Y 10/00 369/13.12 |
| 2011/0216635 A1* | 9/2011 | Matsumoto ............ | G11B 5/105 369/13.33 |
| 2012/0182842 A1* | 7/2012 | Iwanabe ................ | G11B 5/314 369/13.17 |
| 2012/0327751 A1* | 12/2012 | Iwanabe ................ | G11B 5/314 369/13.02 |
| 2013/0142020 A1* | 6/2013 | Rawat ................... | G11B 5/314 369/13.33 |

* cited by examiner

*Primary Examiner* — Tan X Dinh
(74) *Attorney, Agent, or Firm* — Hollingsworth Davis, LLC (57) ABSTRACT

An apparatus includes a write pole proximate a media-facing surface of a recording head. A near-field transducer is adjacent to the write pole. A waveguide has a core layer extending from an energy source to the media-facing surface. The core layer includes a region of reduced downtrack thickness proximate the near-field transducer. The region of reduced downtrack thickness is defined by a notch facing away from the near-field transducer. A material of the notch has a different index of refraction than an index of refraction of the core layer.

18 Claims, 7 Drawing Sheets

WAVEGUIDE CORE LAYER WITH REDUCED DOWNTRACK THICKNESS PROXIMATE A NEAR-FIELD TRANSDUCER

RELATED PATENT DOCUMENTS

This application claims the benefit of Provisional Application Ser. No. 61/981,955 filed on Apr. 21, 2014, to which priority is claimed pursuant to 35 U.S.C. §119(e), and which is incorporated herein by reference in its entirety.

BACKGROUND

A heat-assisted, magnetic recording (HAMR) data storage medium uses a high magnetic coercivity that is able to overcome superparamagnetic effects (e.g., thermally-induced, random, changes in magnetic orientations) that currently limit the areal data density of conventional hard drive media. In a HAMR device, a small portion, or "hot spot," of the magnetic medium is locally heated to its Curie temperature, thereby allowing magnetic orientation of the medium to be changed at the hot spot while being written to by a transducer (e.g., magnetic write pole). After the heat is removed, the region will maintain its magnetic state, thereby reliably storing the data for later retrieval.

SUMMARY

The present disclosure is generally directed to an apparatus that includes a write pole proximate a media-facing surface of a recording head. A near-field transducer is adjacent to the write pole. A waveguide has a core layer extending from an energy source to the media-facing surface. The core layer includes a region of reduced downtrack thickness proximate the near-field transducer. The region of reduced downtrack thickness is defined by a notch facing away from the near-field transducer. A material of the notch has a different index of refraction than an index of refraction of the core layer.

In another embodiment, a method involves activating an energy source that directs energy to a waveguide core of a recording head. The energy propagates to a near-field transducer proximate a write pole and a media-facing surface of the recording head. The energy causes a surface plasmon resonance of the near-field transducer to heat a magnetic recording medium. The method further involves blocking stray light via a region of reduced downtrack thickness of the waveguide core proximate the near-field transducer. The region of reduced downtrack thickness is defined by a notch facing away from the near-field transducer. A material of the notch has a different index of refraction than an index of refraction of the waveguide core.

The above summary is not intended to describe each disclosed embodiment or every implementation of the present disclosure. The figures and the detailed description below more particularly exemplify illustrative embodiments

BRIEF DESCRIPTION OF THE DRAWINGS

Throughout the specification reference is made to the appended drawings, where like reference numerals designate like elements. However, it will be understood that the use of a number to refer to a component in a given figure is not intended to limit the component in another figure labeled with the same number. The figures are not necessarily to scale.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

This disclosure is generally directed to a waveguide used to deliver light to a near-field transducer. In the examples below, the waveguide and near-field transducers are part of a HAMR recording head, although may be applicable to other applications using near-field transducers to deliver energy at diffraction-limited scales. Heat-assisted, magnetic recording, also referred to as energy-assisted media recording (EAMR), thermally-assisted media recording (TAMR), and thermally-assisted recording (TAR), uses an energy source such as a laser to heat a small spot on a magnetic disk during recording. The heat lowers magnetic coercivity at the spot, allowing a write transducer to change magnetic orientation. Due to the relatively high coercivity of the medium after cooling, the data is less susceptible to paramagnetic effects that can lead to bits randomly changing state.

Figure 1:
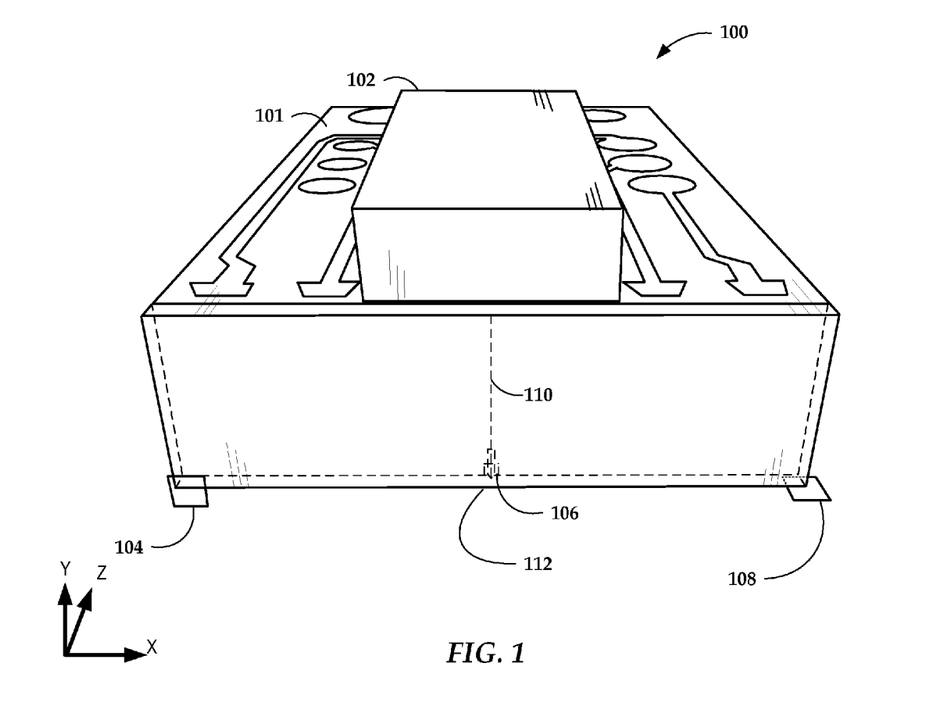
FIG. 1 is a perspective view of a hard drive slider according to an example embodiment.

In reference now to FIG. 1, a perspective view shows a HAMR hard drive slider 100 that may be included in an apparatus according to an example embodiment. The HAMR slider 100 (also referred to as a read/write head, recording head, read head, write head) utilizes an energy source, which in this example is a laser diode 102 located on top of and proximate to a trailing edge surface 104 of a slider body 101. The laser diode 102 delivers light proximate to a read/write transducer 106, which is proximate an air-bearing surface (ABS) 108 (also referred to as a media-facing surface) of the slider body 101. The media-facing surface 108 is held proximate to a moving magnetic medium surface (not shown) during device operation. The read/write transducer 106 may include, among other things, a magnetoresistive reader element and a magnetic write coil that energizes a write pole.

The laser diode 102 provides electromagnetic energy to heat the magnetic medium surface as it passes by the read/write transducer 106. Optical coupling components, such as a waveguide 110 and near-field transducer (NFT) 112, are formed integrally within the HAMR slider 100 to deliver light from laser diode 102 to a region proximate the read/write transducer 106. The light energizes the NFT 112, which provide local heating of the media during write operations. The laser diode 102 in this example may be an integral, edge-emitting device, although it will be appreciated that the waveguide 110 and NFT 112 may be used with any light source. For example, a surface emitting laser (SEL) may be used instead of an edge-emitting laser, and a laser may be mounted elsewhere, or in different orientation, e.g., on the trailing edge surface 104 of the slider body 101.

While the example in FIG. 1 shows the laser diode 102 integrated with the HAMR slider 100, the waveguide 110 and NFT 112 discussed herein may be useful in any type of light delivery configuration. For example, in what is referred to as free-space light delivery, a laser may be mounted externally to the slider, and coupled to the slider by way of optic fibers and/or waveguides. The slider in such an arrangement may include a grating coupler into which light is coupled and delivered to a slider-integrated waveguide 110 which energizes NFT 112.

The waveguide 110 extends from the media-facing surface 108 towards the laser diode 102. There may be intermediary optical components between the laser diode 102 and waveguide 110, such as lenses, mirrors, collimators, phase-shifters, other waveguides, etc. For purposes of this discussion, the waveguide 110 will refer to a contiguous light propagation conduit that delivers light energy proximate to the NFT, the light originating either directly from the laser diode 102 or indirectly via some other intermediary optical component.

Figure 2:
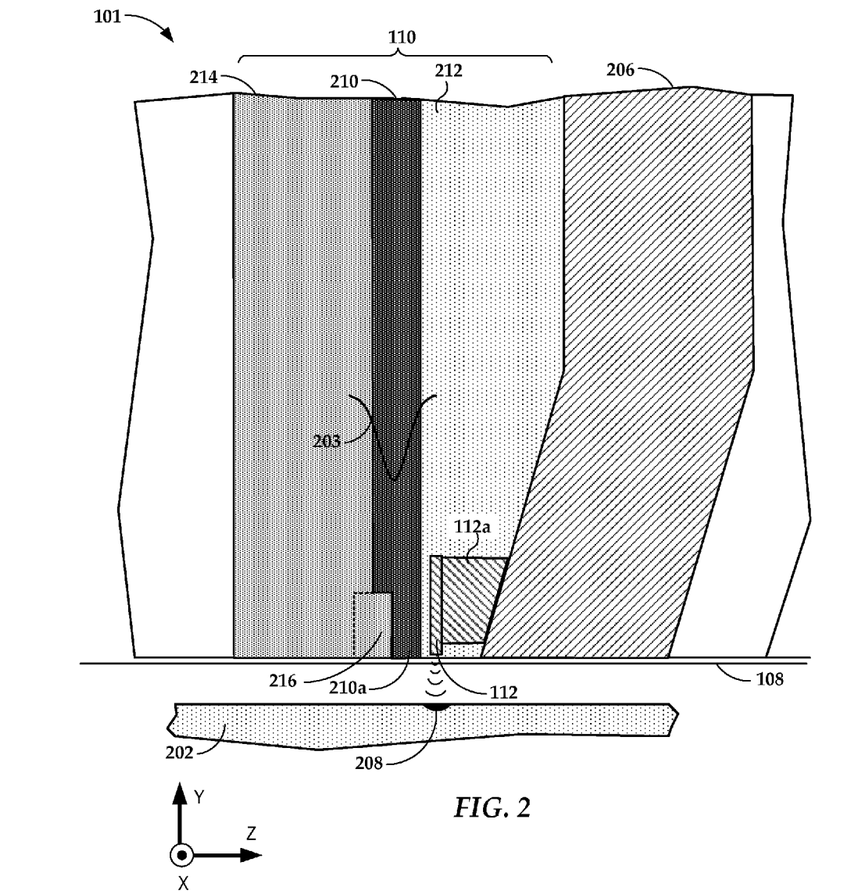
FIG. 2 is a cross-sectional view of a portion a hard drive slider according to an example embodiment.

In FIG. 2, a cross-section diagram illustrates features of a slider body 101 according to an example embodiment. The waveguide 110 is configured to receive electromagnetic energy 203 from an energy source (e.g., laser 102 in FIG. 2). The waveguide 110 includes a layer of core material 210 surrounding by cladding layers 212, 214. The core layer 210 and cladding layers 212, 214 may be made from dielectric materials. The materials are selected so that the refractive index of the core layer 210 is higher than refractive indices of the cladding layers 212, 214. This arrangement of materials facilitates efficient propagation of light through the waveguide 110. Optical focusing elements (not shown) such as mirrors, lenses, etc., may be utilized to concentrate light onto the NFT 112.

The electromagnetic energy 203 induces surface plasmon resonance at the NFT 112, and the surface plasmons are directed to create a small hotspot 208 (e.g., 60 nm or smaller) on a recording medium 202 as it moves past the NFT 112 in the downtrack direction (z-direction). The heat lowers magnetic coercivity of the medium 202, allowing a magnetic flux to change magnetic orientation of the medium 202 near the hotspot 208 without changing magnetic orientation outside of the hotspot 208. A write pole 206 applies the magnetic flux near the media-facing surface 108 in response to applying a current to coils (not shown) magnetically coupled to the write pole 206. A heat sink region 112a of the NFT 112 facilitates conducting heat away from the NFT 112 during operation.

Because the energy 203 is focused in a relatively small volume of the slider body 101, significant temperature increases are seen near the NFT 112 during recording. This is due to, among other things, optical inefficiency of the energy transmission path and absorption of energy in the NFT 112 and its vicinity. These optical inefficiencies can also result in stray light propagating near the NFT region and beyond. Stray light can result from unwanted reflections, evanescent coupling, refraction, and other optical propagation. Stray light can propagate back along the waveguide 110 reducing efficiency therein, and can interfere with other optical components along the light propagation path. Stray light may also exit the media-facing surface 108 of the slider body 101.

In order to better control stray light near the NFT 112, the core layer 210 includes a region of reduced downtrack thickness 210a proximate the near-field transducer 112. The region of reduced downtrack thickness 210a is defined by a notch 216 facing away from the near-field transducer 112. The notch 216 is configured as a rectangular prism in this example. The notch 216 may be filled with the surrounding material, e.g., material of cladding layer 214. As indicated by the dashed lines, the notch 216 may be filled by a different material than that of the cladding layer 214. The notch 216 will have different index of refraction than the material of the core layer 210. For the example embodiments described hereinbelow, the index of refraction of the notch 216 is lower than that of the core layer 210, although it may be larger in some configurations. The index of refraction of the notch 216 may the same as or different than that of the proximate cladding layer 214.

In this example, the waveguide 110 may be configured as a planar waveguide or channel waveguide. In either case, the core layer 210 may include a substantially uniform cross-sectional shape (e.g., rectangular) in a plane parallel to the media-facing surface as the core layer 210 extends away from the region of reduced downtrack thickness 210a.

Figure 3:
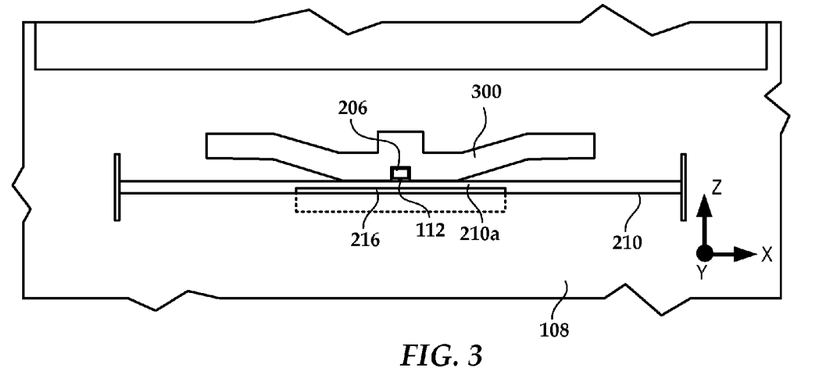
FIG. 3 is plan view at a media facing surface of a hard drive slider according to an example embodiment.

In FIG. 3, a plan view of the media-facing surface 108 shows additional details of the core layer 210 and notch 216. The notch 216 is shown in this view extending over part of the cross-track width (x-direction) of the core layer 210. In other embodiments, the notch 216 may extend over the entire width of the core layer 210. Also seen in this view is a heat sink 300 which conducts heat away from the write pole 206 and NFT 112. The cross-track width of the notch 216 may be selected based on these and other structures located down-track (z-direction) relative to the waveguide core 210.

Figure 4:
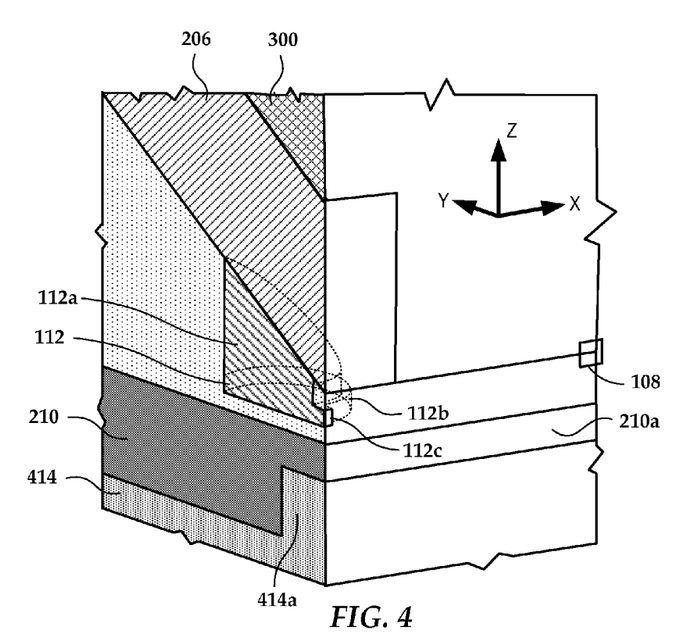
FIGS. 4-6 are perspective, cross-sectional views of a slider showing waveguide cores according to different example embodiments.

In FIG. 4, a cross-sectional perspective view shows the configuration of the waveguide core 210 according to a first embodiment. This cross-section is taken along a cross-track centerline of a slider body. In this case, a notch 414a is an extension of a cladding layer 414, and fills a side of the region of reduced downtrack thickness 210a of the core layer 210 that faces away from the NFT 112. In this view, it can be seen that the NFT 112 is configured as a circular disk 112b with a peg 112c protruding towards the media-facing surface 108. The heat sink region 112a of the NFT 112 also has a circular cross section on the xy-plane.

Figure 5:
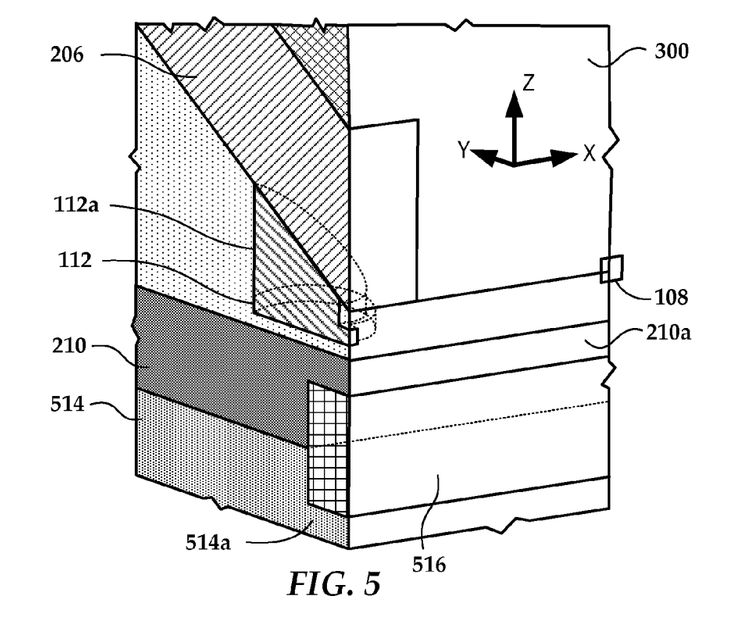

In FIG. 5, a cross-sectional perspective view shows the configuration of the waveguide core 210 according to a second embodiment. This cross-section is taken along a cross-track centerline of a slider body. In this case, a notch 516 fills a region between cladding layer 514 and the region of reduced downtrack thickness 210a of the core layer 210. The notch 516 is formed from a different material than that of the cladding layer 514 and core layer 210, and has a different index of refraction than that of at least the core layer 210. The downtrack dimension of the notch 516 results in a region of reduced downtrack thickness 514a in the cladding layer 514. This is in contrast to a third embodiment shown in the cross-sectional perspective view of FIG. 6.

Figure 6:
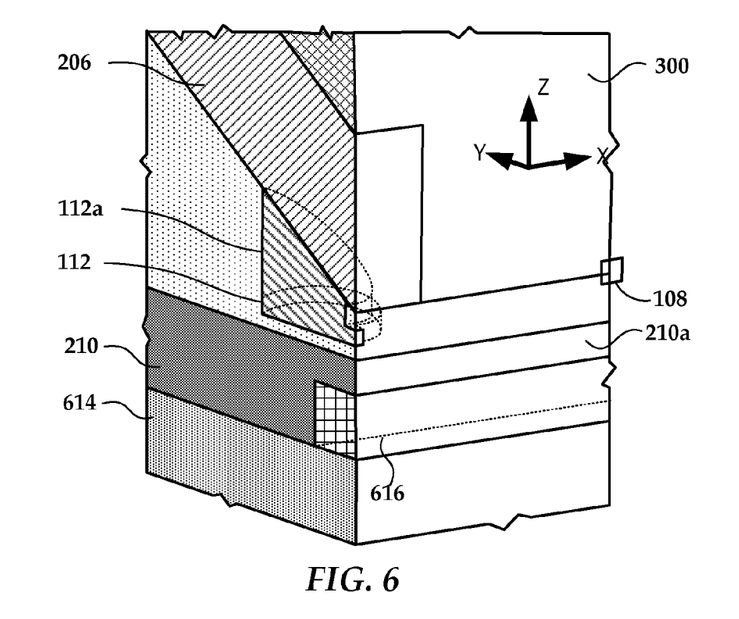

In FIG. 6, cladding layer 614 has a constant cross-sectional shape on the xz-plane all along the y-direction. The notch 616 notch 516 fills a region between cladding layer 514 and the region of reduced downtrack thickness 210a of the core layer 210. The notch 616 is formed from a different material than that of the cladding layer 614 and core layer 210, and has a different index of refraction than that of at least the core layer 210.

Figure 7:
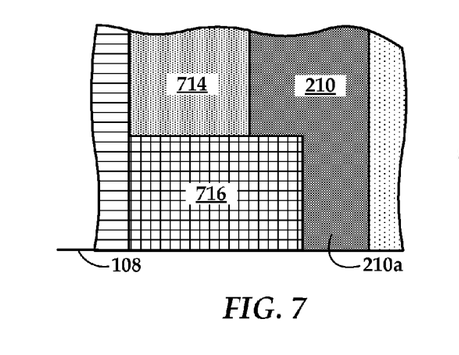
FIGS. 7-10 are cross-sectional views of a slider showing waveguide cores according to different example embodiments.

In FIGS. 7-10, block diagrams illustrate configurations of a waveguide core layer according to other example embodiments. The diagrams of FIGS. 7-10 are yz-plane cross sections of a slider near a media-facing surface 108, similar to the view of FIG. 2. In these views, an NFT (not shown) is located to the right of the waveguide core. In FIG. 7, a notch 716 is disposed near region of reduced downtrack thickness 210a of waveguide core layer 210. Material of the notch 716 is different than that of both waveguide core layer 210 and a cladding layer 714. The notch 716 is located between the media-facing surface 108 and cladding layer 714, completely covers a distal end of the waveguide cladding layer 714.

Figure 8:
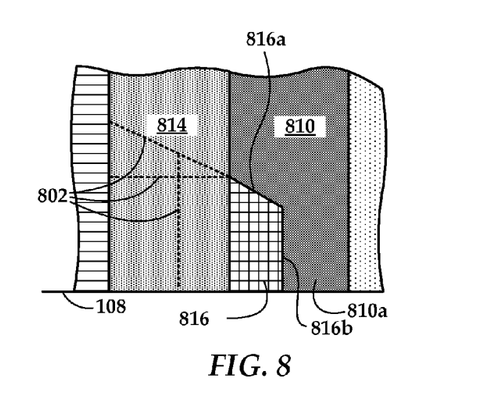

In FIG. 8, a notch 816 is disposed near region of reduced downtrack thickness 810a of a waveguide core layer 810. The notch 816 has a trapezoidal cross-section in this view, with a first surface 816a that faces but is not parallel to the media-facing surface 108. A second surface 816b of the notch is substantially parallel to a substrate surface, e.g., a generally planar surface on which the core layer 810 and other layers are deposited. Material of the notch 816 is different than that of the core layer 810. Material of the notch 816 may be the same or different than that of a cladding layer 814. In the latter case, the notch 816 as shown does not project into the cladding layer 814. However, as indicated by dashed lines 802, the notch 816 in such a case may be extended such that it is located between the media-facing surface 108 and cladding layer 814, partially or fully covering a distal end of the waveguide cladding layer 814.

Figure 9:
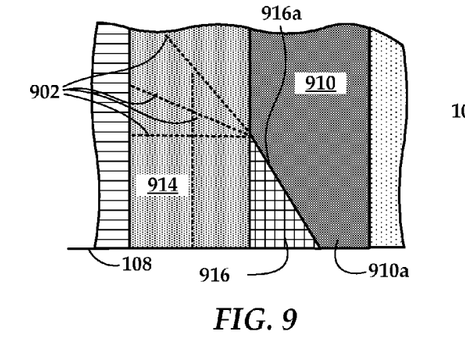

In FIG. 9, a notch 916 is disposed near region of reduced downtrack thickness 910a of a waveguide core layer 910. The notch 916 has a triangular cross-section in this view, with a first surface 916a that faces but is not parallel to the media-facing surface 108. Material of the notch 916 is different than that of the core layer 910. Material of the notch 916 may be the same or different than that of a cladding layer 914. In the latter case, the notch 916 as shown does not project into the cladding layer 914. However, as indicated by dashed lines 902, the notch 916 in such a case may be extended such that it is located between the media-facing surface 108 and cladding layer 914, partially or fully covering a distal end of the waveguide cladding layer 914.

Figure 10:
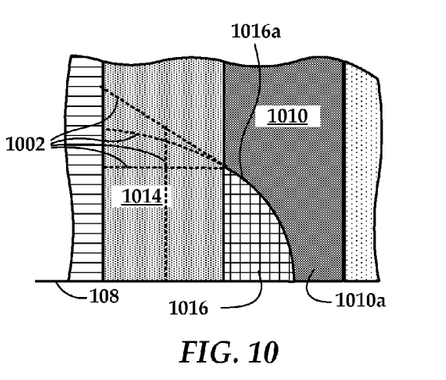

In FIG. 10, a notch 1016 is disposed near region of reduced downtrack thickness 1010a of a waveguide core layer 1010. The notch 1016 has a curved cross-section (e.g., circular or parabolic sector) in this view, with a first surface 1016a that faces but is not parallel to the media-facing surface 108. Material of the notch 1016 is different than that of the core layer 1010. Material of the notch 1016 may be the same or different than that of a cladding layer 1014. In the latter case, the notch 1016 as shown does not project into the cladding layer 1014. However, as indicated by dashed lines 1002, the notch 1016 in such a case may be extended such that it is located between the media-facing surface 108 and cladding layer 1014, partially or fully covering a distal end of the waveguide cladding layer 1014.

An analysis was performed of some configurations of a waveguide core layers as described above. A simulation of a notch geometry as shown in FIG. 5 was performed. The notch region 516 was modeled with two different materials. A baseline case was also modeled, without a narrowed or notched core region. The materials of the notch region 516 in the simulations were air (n=1) and SiO$_2$ (n=1.46). In all cases, the notch 516 extended 125 nm into the media-facing surface (y-direction), and reduced the core layer thickness (z-direction) by about 50% near the NFT 112.

The simulation measured scaled media-to-head temperature (sMH), scaled thermal gradient (sTG), downtrack erasure (DTE), crosstrack erasure (CTE), and coupling efficiency (CE) of light into a recording medium. Results of the simulation are summarized in Table 1 below. Coupling efficiency is expressed as a difference over the baseline case.

TABLE 1

| Simulation results | | | | | |
|---|---|---|---|---|---|
| Notch Material | sMH | sTG | DTE | CTE | CE |
| Baseline | 7.1 | 4.4 | 84 | 128 | 1.0 |
| Air | 4.9 | 5.9 | 40 | 103 | 1.37 |
| SiO$_2$ | 6.0 | 5.1 | 60 | 113 | 1.15 |

Figure 11:
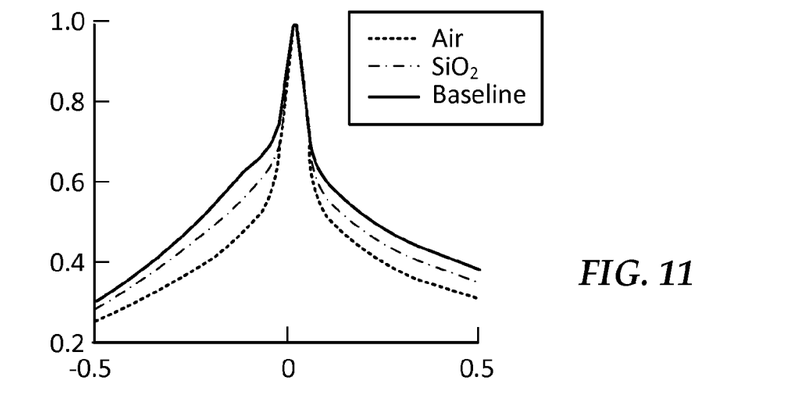
FIGS. 11-13 are graphs showing simulation results of optical performance of a slider according to example embodiments.
Figure 12:
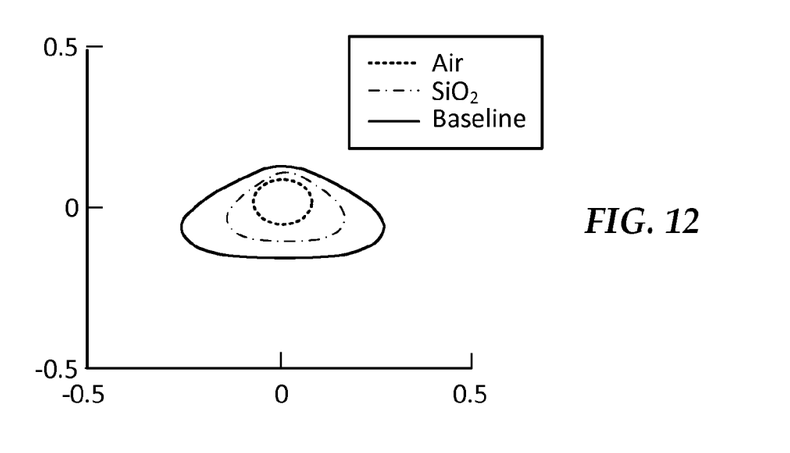
Figure 13:
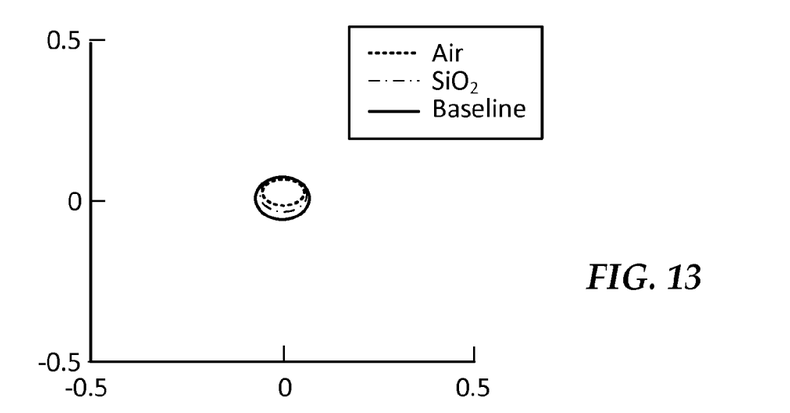

Additional results of the simulation are shown in FIGS. 11-13. In FIG. 11, a graph shows scaled temperature in a downtrack direction, from −5 μm to 5 μm centered around the write pole/NFT. In FIG. 12, a graph shows, for each of the cases, profiles of downtrack erasure centered −5 μm to 5 μm around the write pole/NFT in the crosstrack and downtrack directions. In FIG. 13, a graph shows, for each of the cases, profiles of downtrack erasure centered −5 μm to 5 μm around the write pole/NFT in the crosstrack and downtrack directions.

As these results indicate, the use of a reduced downtrack thickness of a waveguide core along with a notch of different material result in improved coupling efficiency, increased confinement, higher thermal gradient, and lower erasure. These attributes can were most improved for the lowest index of refraction, which in this case had the greatest difference from the index of the core layer. Similar results are expected for a notch extends up to 200 nm inward normal to the media-facing surface, and/or for a waveguide where the region of reduced downtrack thickness has a thickness between 40% and 60% less than that of a portion of the core layer that extends away from the region of reduced downtrack thickness.

Figure 14:
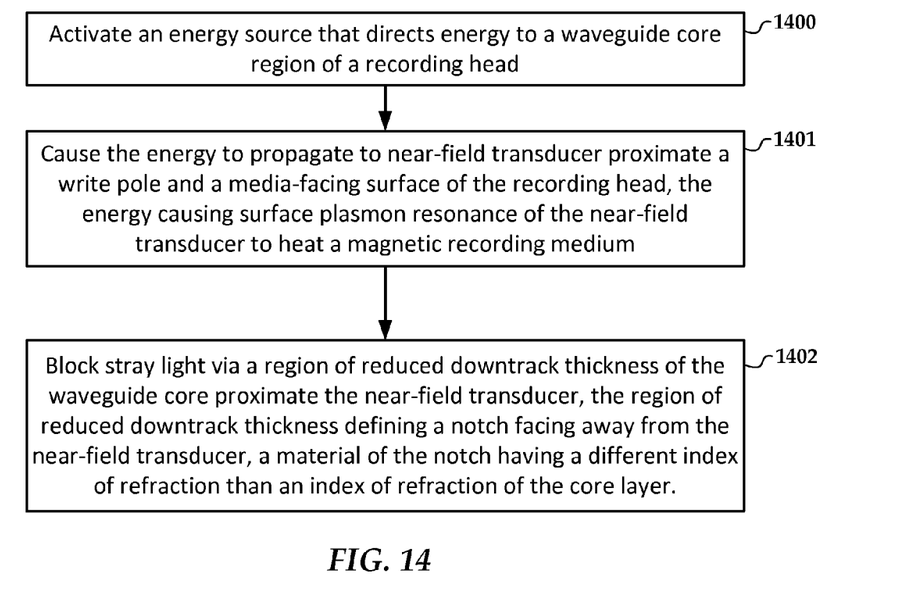
FIG. 14 is a flowchart of a method according to an example embodiment.

In reference now to FIG. 14, a flowchart illustrates a method according to an example embodiment. The method involves activating 1400 an energy source (e.g., laser) that directs energy to a waveguide core region of a recording head. The energy propagates 1401 to near-field transducer proximate a write pole and a media-facing surface of the recording head. The energy causing a surface plasmon resonance of the near-field transducer to heat a magnetic recording medium. Stray light is blocked 1402 via a region of reduced downtrack thickness of the waveguide core proximate the near-field transducer. The region of reduced downtrack thickness is defined by a notch facing away from the near-field transducer. A material of the notch has a different index of refraction than an index of refraction of the core layer.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An apparatus comprising:
  a write pole proximate a media-facing surface of a recording head;
  a near-field transducer adjacent to the write pole; and
  a waveguide having a core layer extending from an energy source to the media-facing surface, the core layer comprising a region of reduced downtrack thickness proximate the near-field transducer, the region of reduced downtrack thickness defined by a notch comprising a rectangular prism with a surface parallel to the media-facing surface, the notch facing away from the near-field transducer, a material of the notch having a different index of refraction than an index of refraction of the core layer, wherein the region of reduced downtrack thickness has a thickness between 40% and 60% less than that of a portion of the core layer that extends away from the region of reduced downtrack thickness.

2. The apparatus of claim 1, wherein the core layer includes a substantially uniform cross-sectional shape in a plane parallel to the media-facing surface as the core layer extends away from the region of reduced downtrack thickness.

3. The apparatus of claim 1, wherein the different index of refraction is lower than the index of refraction of the core layer.

4. The apparatus of claim 1, wherein the different index of refraction is 1.5 or less.

5. The apparatus of claim 1, further comprising a cladding layer disposed on a side of the core layer that faces away from the near-field transducer, the cladding layer filling the notch.

6. The apparatus of claim 1, further comprising a cladding layer disposed on a side of the core layer that faces away from the near-field transducer, the cladding comprising a region of reduced downtrack cladding thickness proximate the notch, wherein the material of the notch is different than a cladding material of the cladding layer.

7. The apparatus of claim 1, wherein the near-field transducer comprises a disk with a peg extending therefrom toward the media-facing surface.

8. The apparatus of claim 1, wherein the region of reduced downtrack thickness and the notch reduce effects of stray light near the media-facing surface.

9. The apparatus of claim 1, wherein the notch extends up to 200 nm inward normal to the media-facing surface.

10. An apparatus comprising:
  a write pole proximate a media-facing surface of a recording head;
  a near-field transducer adjacent to the write pole; and
  a waveguide having a cladding and a core, the core extending from an energy source to the media-facing surface, the core comprising a region of reduced downtrack thickness proximate the near-field transducer, the region of reduced downtrack thickness defined by a notch comprising a rectangular prism with a surface parallel to the media-facing surface, the notch facing away from the near-field transducer and toward the cladding, a material of the notch having a different index of refraction than an index of refraction of the core, the material of the notch being different than a core material of the core and a cladding material of the cladding, wherein the region of reduced downtrack thickness has a thickness between 40% and 60% less than that of a portion of the core layer that extends away from the region of reduced downtrack thickness.

11. The apparatus of claim 10, wherein the different index of refraction is lower than the index of refraction of the core layer.

12. The apparatus of claim 10, wherein the region of reduced downtrack thickness and the notch reduce effects of stray light near the media-facing surface.

13. The apparatus of claim 10, wherein the notch extends up to 200 nm inward normal to the media-facing surface.

14. A method comprising:
  activating an energy source that directs energy to a waveguide core of a recording head;
  causing the energy to propagate to a near-field transducer proximate a write pole and a media-facing surface of the recording head, the energy causing a surface plasmon resonance of the near-field transducer to heat a magnetic recording medium; and
  blocking stray light via a region of reduced downtrack thickness of the waveguide core proximate the near-field transducer, the region of reduced downtrack thickness defined by a notch comprising a rectangular prism with a surface parallel to the media-facing surface, the notch facing away from the near-field transducer, a material of the notch having a different index of refraction than an index of refraction of the waveguide core, wherein the region of reduced downtrack thickness has a thickness between 40% and 60% less than that of a portion of the core layer that extends away from the region of reduced downtrack thickness.

15. The method of claim 14, wherein the different index of refraction is lower than the index of refraction of the waveguide core.

16. The apparatus of claim 1, wherein an end surface of the region of reduced downtrack thickness is exposed at the media-facing surface.

17. The apparatus of claim 1, wherein the rectangular prism has a cross-track width that is less than that of the waveguide core.

18. The apparatus of claim 1, wherein the energy source comprises a laser mounted on a top surface of the recording head that is parallel to and faces away from the media-facing surface.

* * * * *